US008750122B1

(12) United States Patent
Assarpour

(10) Patent No.: US 8,750,122 B1
(45) Date of Patent: Jun. 10, 2014

(54) METHOD AND APPARATUS FOR LAYER 2 LOOP PREVENTION IN A MULTI-NODE SWITCH CLUSTER

(75) Inventor: Hamid Assarpour, Arlington, MA (US)

(73) Assignee: Avaya, Inc., Basking Ridge, NJ (US)

( * ) Notice: Subject to any disclaimer, the term of this patent is extended or adjusted under 35 U.S.C. 154(b) by 32 days.

(21) Appl. No.: 13/426,914

(22) Filed: Mar. 22, 2012

(51) Int. Cl.
H04L 12/28 (2006.01)

(52) U.S. Cl.
USPC .......................... 370/235; 370/390; 370/392

(58) Field of Classification Search
USPC ......... 370/229, 230, 235, 249, 254, 255, 270, 370/312, 389, 390, 392, 400, 466, 469, 542
See application file for complete search history.

(56) References Cited

U.S. PATENT DOCUMENTS

| 6,147,995 | A  | * | 11/2000 | Dobbins et al. | 370/392 |
| 6,181,699 | B1 | * | 1/2001  | Crinion et al. | 370/392 |
| 6,233,242 | B1 | * | 5/2001  | Mayer et al. | 370/412 |
| 6,430,626 | B1 | * | 8/2002  | Witkowski et al. | 709/249 |
| 6,469,987 | B1 | * | 10/2002 | Rijhsinghani | 370/254 |
| 6,813,250 | B1 | * | 11/2004 | Fine et al. | 370/256 |
| 6,842,430 | B1 | * | 1/2005  | Melnik | 370/254 |
| 7,126,923 | B1 | * | 10/2006 | Yang et al. | 370/256 |
| 7,738,360 | B2 | * | 6/2010  | Gillespie et al. | 370/216 |
| 7,826,447 | B1 | * | 11/2010 | Bishara et al. | 370/389 |
| 8,446,914 | B2 | * | 5/2013  | Cheng et al. | 370/401 |
| 8,503,445 | B2 | * | 8/2013  | Lo et al. | 370/389 |
| 2002/0019875 | A1 | * | 2/2002 | Garrett et al. | 709/230 |
| 2004/0068589 | A1 | * | 4/2004 | Witkowski et al. | 709/249 |
| 2005/0147094 | A1 | * | 7/2005 | Malalur | 370/389 |
| 2006/0013141 | A1 | * | 1/2006 | Mutoh et al. | 370/241 |
| 2007/0230369 | A1 | * | 10/2007 | McAlpine | 370/256 |
| 2007/0280104 | A1 | * | 12/2007 | Miyoshi et al. | 370/229 |
| 2008/0267081 | A1 | * | 10/2008 | Roeck | 370/249 |
| 2009/0109972 | A1 | * | 4/2009 | Chen | 370/390 |
| 2010/0002703 | A1 | * | 1/2010 | Kogata et al. | 370/392 |
| 2010/0135307 | A1 | * | 6/2010 | Nakagawa | 370/395.53 |
| 2010/0278180 | A1 | * | 11/2010 | Ma | 370/392 |
| 2011/0317700 | A1 | * | 12/2011 | Assarpour | 370/392 |
| 2012/0033665 | A1 | * | 2/2012 | Jacob Da Silva et al. | 370/389 |
| 2012/0033678 | A1 | * | 2/2012 | Page et al. | 370/401 |
| 2013/0016627 | A1 | * | 1/2013 | Higashihara et al. | 370/254 |

OTHER PUBLICATIONS

Nortel, Nortel Ethernet Routing Switch 8600 Configuration—Link Aggregation, MLT, and SMLT Release: 7.0 Document Revision: 03.02, Apr. 12, 2010.*

* cited by examiner

Primary Examiner — Paul H. Masur
Assistant Examiner — Michael Phillips
(74) Attorney, Agent, or Firm — Anderson Gorecki & Rouille LLP

(57) ABSTRACT

A LAG/MLT ID is assigned to each LAG/MLT connecting to a switch cluster. Packets transmitted on the IST port are tagged with the LAG/MLT ID. Each switch in the switch cluster maintains a single MGID per VLAN ID. The MGID includes all IST ports as well as VLAN ID user port members. If a broadcast packet is received on an IST, any packet copy destined to the receiving IST port is dropped and any packet copy destined to a LAG/MLT port that matches the incoming tag is dropped. The LAG/MLT ID is preserved when the packet is sent to other IST ports and is removed when the packet is sent to a user port. By using a global ID for the LAG/MLT differentiated treatment of packets forwarded on the IST may be achieved using a single MGID per VLAN ID thus conserving resources.

14 Claims, 5 Drawing Sheets

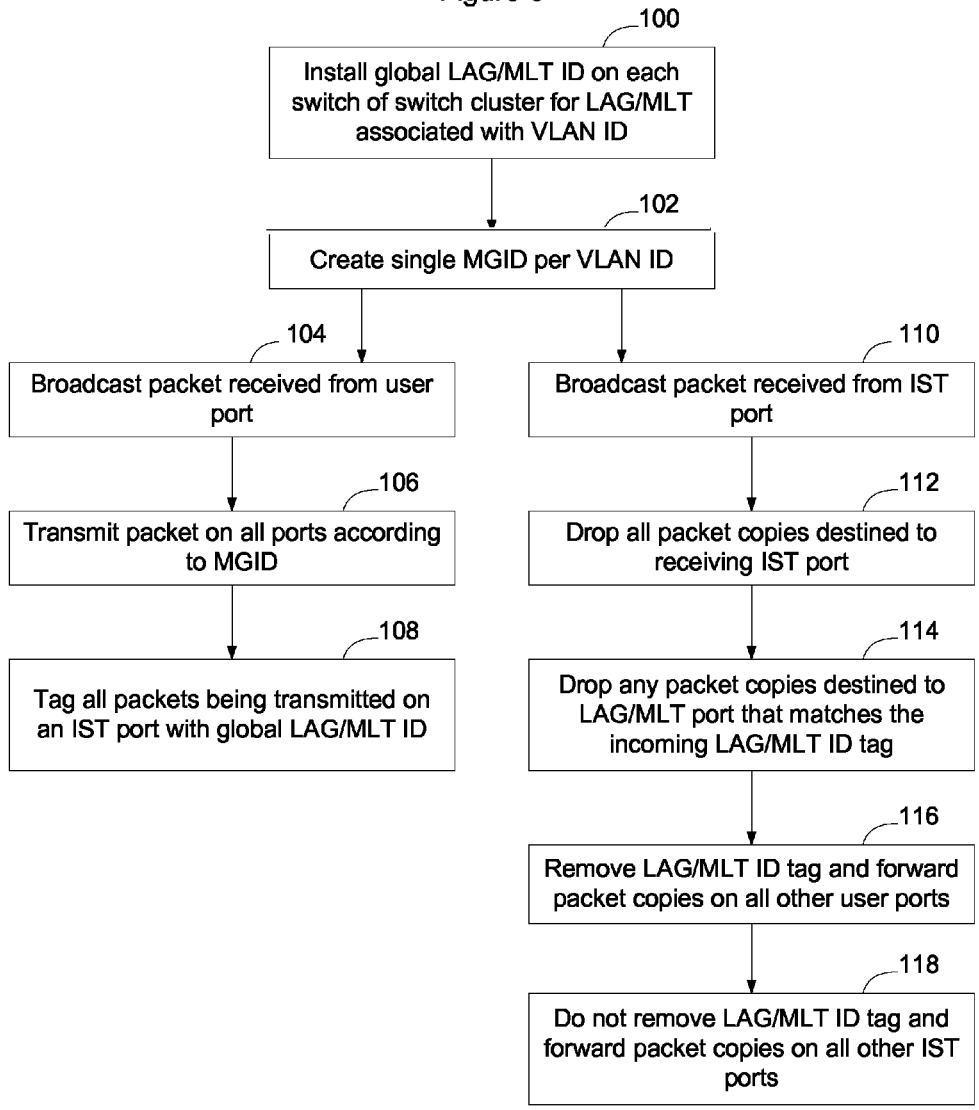

METHOD AND APPARATUS FOR LAYER 2 LOOP PREVENTION IN A MULTI-NODE SWITCH CLUSTER

CROSS-REFERENCE TO RELATED APPLICATIONS

None.

BACKGROUND

1. Field

This application relates to communication networks and, more particularly, to a method and apparatus for layer 2 loop prevention in a multi-node switch cluster.

2. Description of the Related Art

Data communication networks may include various computers, servers, hubs, switches, nodes, routers, other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

One way to make networks more reliable is to provide redundant connections between network elements using multiple physical links. In this scenario, although physically the links are separate, logically they may be viewed as a single trunk by upper layers of the networking stack so that a failure of one of the links forming the logical trunk will not require corrective action at the link or networking layers. Rather, the network is able to accommodate a failure of one of the physical links by causing traffic to be shifted to one of the other links interconnecting the network elements. A link that is implemented in this manner will be referred to herein as a "multi-link trunk".

To further increase reliability, it is possible to cause the physical links implementing a multi-link trunk to be connected to different switches forming a switch cluster. A link implemented in this manner will be referred to herein as a "split multi-link trunk" or SMLT. The switches at the split end of the SMLT are interconnected using a subset of their normal Input/Output (I/O) ports. The connection between the switches of the switch cluster is referred to herein as an Inter Switch Trunk (IST) and the ports that are used to communicate between the switches of the switch cluster are referred to as IST ports. The IST may be implemented using one or more physical links or may be implemented as a logical connection over one or more intervening nodes.

All I/O ports that are not IST type are referred to as User I/O ports or User ports. Endpoint devices connect to the switch cluster using user ports. An endpoint device can connect to the switch cluster via either a single physical user port or a set of user ports bundled as one logical port. These bundled ports are referred to as a link aggregation group or Multi-Link Trunk. When a single physical user port is used, the endpoint is connected to only one of the switches within the switch cluster. When a LAG/MLT is used, the endpoint can be connected to one or more switches within the switch cluster. For optimal resiliency, each port member in the LAG/MLT is connected to separate switches within the cluster. This type of LAG/MLT connectivity is referred to as Split MLT or SMLT.

When a switch member within the switch cluster receives a broadcast packet or a unicast packet with an unknown destination address from a user port that belongs to a split LAG/MLT, the receiving switch broadcasts the packet to all the IST ports as well as to all the ports that are members of the VLAN ID of the incoming packet. Broadcasting the packet on the IST ports allows other nodes of the switch cluster to receive a copy of the packet, so that they likewise may broadcast the packet to all members of the VLAN ID of the incoming packet.

However, all other switches that receive a copy of the broadcast packet via their IST ports must forward this packet copy such that no loop is created. Since at least some of the members of the switch cluster will also have user ports connected to links that form part of the LAG/MLT on which the packet was received, care must be taken to prevent these switches from transmitting a copy of the packet out these ports. Specifically, to prevent loop formation, the switches are required to not send a copy of the packet to a user port that is also a member of the receiving LAG/MLT. Specifically, the switches of the switch cluster are required to not forward the packet back toward the endpoint device over another user port that is part of the LAG/MLT on which the packet was received.

One common way to prevent this from occurring is for each switch member to maintain two Multicast Group IDs (MGIDs) per VLAN ID. An MGID may be thought of as a bitmap, in which each bit corresponds to an outgoing port. When a multicast packet is received, an MGID is applied to the packet and used by the switch to determine which output ports should receive a copy of the packet for forwarding. To prevent loops from occurring, one MGID is used to forward packets received from a user port and a second MGID is used to forward packets received from the IST ports. In particular, if a packet is received from a user port, a first MGID is assigned to the packet that includes all VLAN ID's user port members as well as the IST ports, whereas if the packet is received from an IST port a second MGID is assigned that includes all the IST ports as well as the VLAN ID's user port members that are not a member of any split LAG/MLT. By using two MGIDs, in this manner, traffic received from a user port will be forwarded to all other user ports associated with the VLAN ID as well as over the IST, while traffic received from the IST will only be forwarded over other IST ports and over user ports that are not part of a split LAG/MLT.

While this solution prevents loops from occurring, by preventing traffic from being passed from the IST back over one of the links associated with a split MLT, it has two drawbacks. First, the number of MGIDs available within a given switch is typically limited. Using two MGIDs per VLAN ID doubles the usage of MGIDs, which may adversely affect scalability. Second, in the advent of a port failure, the MGID memberships may be modified. For example, assume two links form a split LAG/MLT across two switches of a switch cluster. Failure of one of the ports on one of the switches will cause the other link to change status from a LAG/MLT port to a normal user port. Accordingly, when two MGIDs are used, port failure and other failure information may require inter-switch control plane synchronizations and can cause large packets loss during failover and recovery. Likewise, during recovery it can be very complex to eliminate any time window for loop creation. Accordingly it would be advantageous to provide a method and apparatus for loop prevention in a multi-node switch cluster.

SUMMARY OF THE DISCLOSURE

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A method and apparatus for loop prevention in a multi-node switch cluster is provided, in which a LAG/MLT ID is assigned to each LAG/MLT connecting to the switch cluster. Packets being transmitted on the IST port are tagged with the LAG/MLT ID. Each switch in the switch cluster maintains a single MGID per VLAN ID. The MGID includes all IST ports as well as VLAN ID user port members. If a broadcast packet is received on an IST, any packet copy destined to the receiving IST port is dropped and any packet copy destined to a LAG/MLT port that matches the incoming tag is dropped. The LAG/MLT ID is preserved when the packet is sent to other IST ports and is removed when the packet is sent to a user port. By using a global ID for the LAG/MLT, differentiated treatment of packets forwarded on the IST may be achieved using a single MGID per VLAN ID thus conserving resources. Likewise, since membership in the LAG/MLT does not change with port failure, port failure synchronization is not required between switches of the switch cluster since remote port failure does not affect MGID implementation on other switches of the switch cluster.

Those skilled in the art will appreciate the scope of the present invention and realize additional aspects thereof after reading the following detailed description of the preferred embodiments in association with the accompanying figures.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

FIG. 6 is a flow diagram illustrating an example process of preventing loop formation according to an embodiment.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
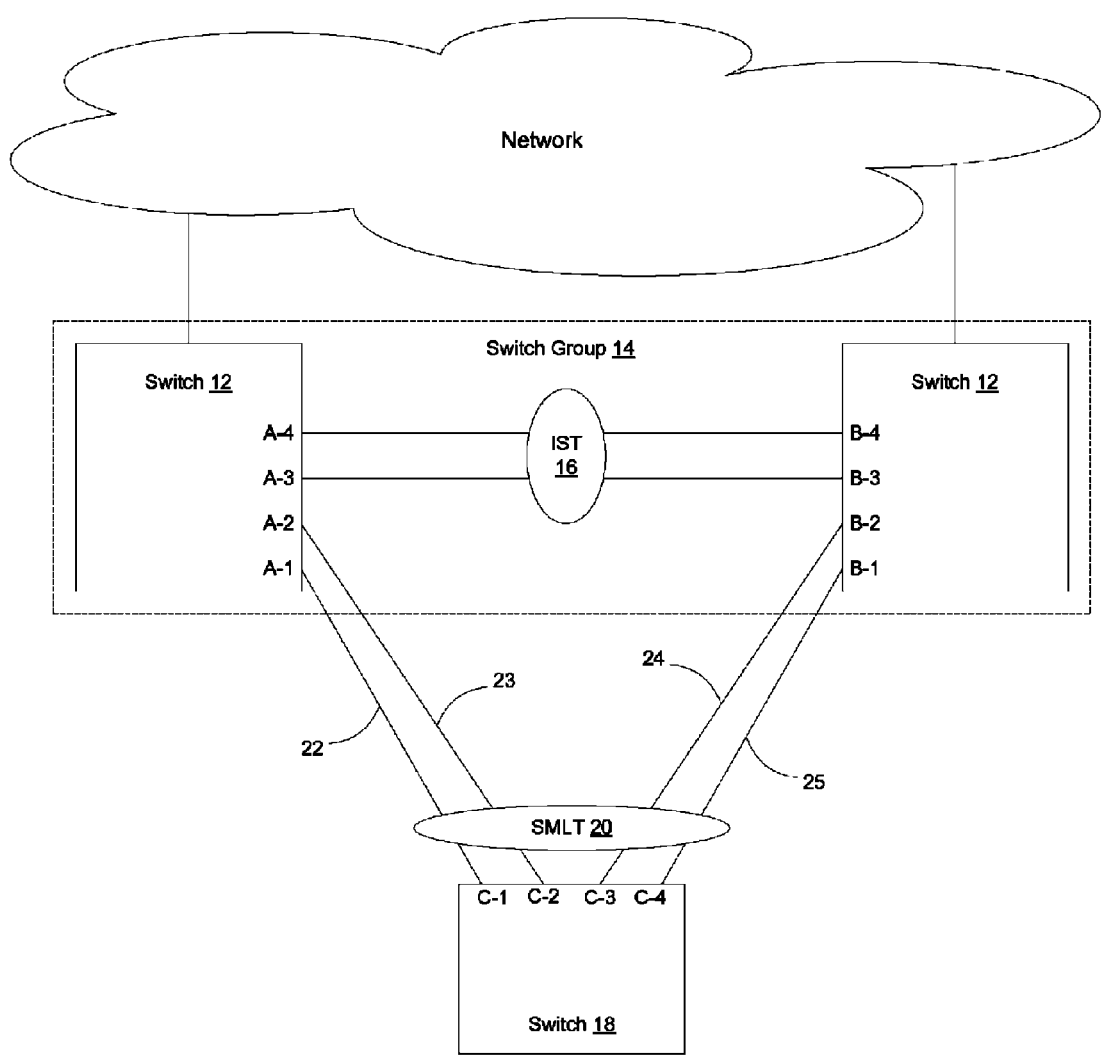
FIG. 1 is a functional block diagram of an example network showing a triangular SMLT arrangement.

FIG. 1 illustrates an example of a network topology 10 in which a plurality of switches 12 form a switch group 14. The switches of the switch group are interconnected using an Inter-Switch trunk 16, which may include one or more physical or logical links. Another switch 18 connects to each of the switches of the switch group 14 using a split multi-link trunk (SMLT) 20. In the illustrated example, switch 18 is connected to a first of the switches using links 22, 23, and is connected to a second of the switches using links 24, 25. Ports A1, A2, B1, B2 on the switches of the switch group connect to the links forming the SMLT. Ports A3, A4, B3, and B4 are IST ports in the illustrated example.

If a broadcast packet is transmitted by switch 18 on one of SMLT links 22-25, the receiving switch will forward the broadcast packet on each of the output links associated with the VLAN on which the broadcast packet was received. To prevent a routing loop, the switches 12 should not transmit a packet received on one of the SMLT ports A1, A2, B1, B2, back out on another of the SMLT ports. Thus, for example, if a broadcast packet is received on SMLT port A1, the packet should not also be transmitted out of any of ports A2, B1, or B2.

Figure 2:
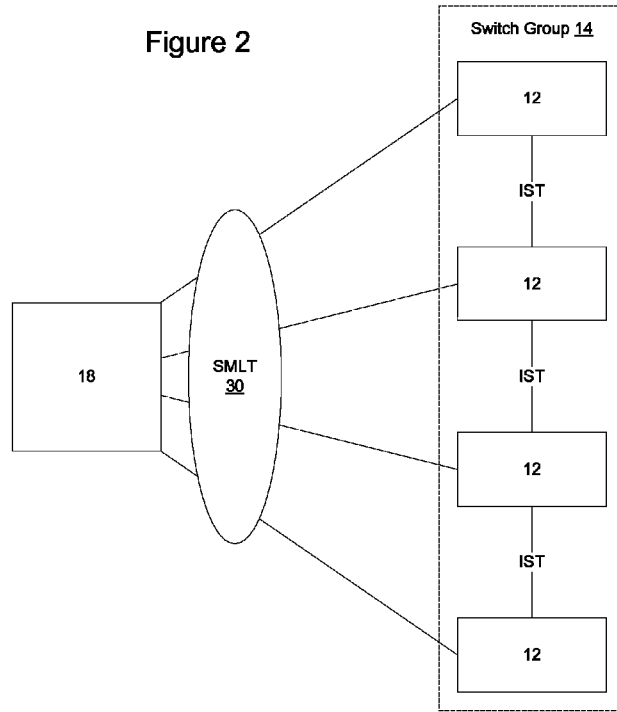
FIGS. 2 and 3 are functional block diagrams showing several other example SMLT interconnection possibilities.
Figure 3:
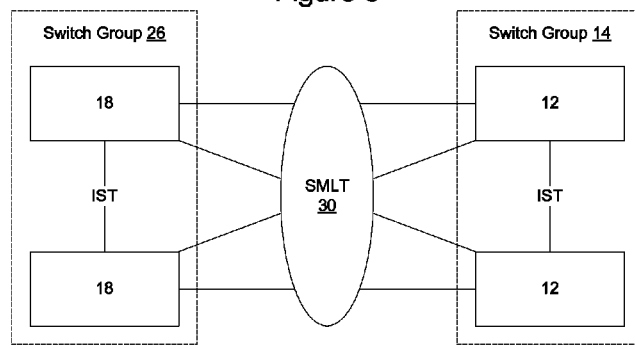

FIG. 1 shows one possible SMLT arrangement, in which one switch 18 is interconnected with two switches 12 forming a switch group 14. The switch group 14 may include more than two switches 12 as shown in FIG. 2. Likewise, the switch 18 may itself be implemented as a switch group 26, as shown in FIG. 3. Although an example will be described in connection with a relatively simple SMLT arrangement, such as the arrangement shown in FIG. 1, the invention is not limited to implementation in this particular arrangement as it may equally apply to other SMLT arrangements such as those shown in FIGS. 2 and 3, and in other interconnection arrangements where multiple links are implemented as a logical link to interconnect one switch or group of switches with two or more switches forming a switch group 14. A defining characteristic of a switch group, as that term is used herein, is that the switches 12 of a switch group 14 are interconnected using an inter-switch trunk which is treated differently than a normal user port by the switches in the switch group.

Figure 4:
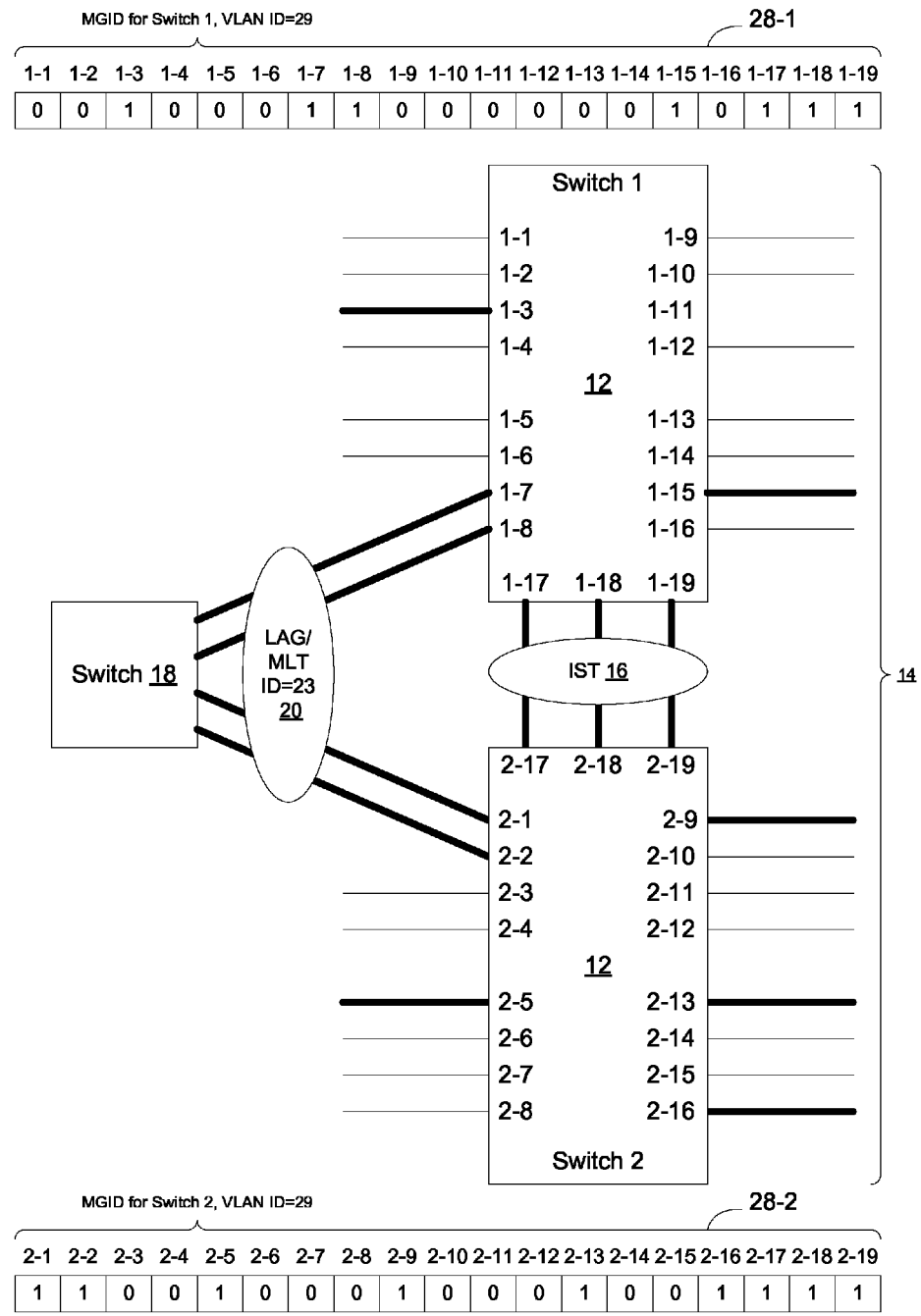
FIG. 4 is a functional block diagram of an example SMLT implemented according to an embodiment.

FIG. 4 shows the SMLT arrangement of FIG. 1 in greater detail. In the example shown in FIG. 4, Switch 1 includes ports 1-1 through 1-19. Likewise Switch 2 includes ports 2-1 through 2-19. Ports 1-17, 1-18, and 1-19 on switch 1, and ports 2-17, 2-18, and 2-19 on switch 2 are connected to inter-switch trunk 16.

In the example shown in FIG. 4, dark lines indicate links connected to ports that are part of a Virtual Local Area Network (VLAN). To help describe operation of an embodiment, in the illustrated example the VLAN ID has been arbitrarily set to VLAN ID=29. In operation a large number of VLANs may be provisioned on the network, each of which would be implemented using a unique VLAN ID. In FIG. 4, user ports 1-3 and 1-15, LAG/MLT ports 1-7 and 1-8, and IST ports 1-17, 1-18, and 1-19 on switch 1 are associated with VLAN ID=29. Similarly, on switch 2, user ports 2-5, 2-9, 2-13, and 2-16, IST ports 2-17, 2-18, and 2-19, and split LAG/MLT ports 2-1 and 2-2, are associated with VLAN ID=29.

According to an embodiment, a global Link Aggregation Group/Multi-Link Trunk Identifier (LAG/MLT ID) is assigned to the SMLT. This same LAG/MLT ID is provisioned in each of the switches forming the switch group 14. In the example shown in FIG. 4, the LAG/MLT ID assigned to the SMLT between switch 18 and switch group 14 has been arbitrarily assigned LAG/MLT ID=23. Accordingly, switch 1 would associate LAG/MLT ID=23 with ports 1-7 and 1-8, and switch 2 would associate LAG/MLT ID=23 with ports 2-1 and 2-2. The LAG/MLT ID and the VLAN ID used in this example have been selected for description purposes only, and it is to be understood that many different values may be used.

As shown in FIG. 4, each switch will also create one Multicast Group Identifier (MGID) which will be used within that switch to specify a group of output ports, on the switch, associated with the VLAN. The MGID may be thought of, in one sense, as a bit map or an array which identifies particular output ports that should receive a copy of all broadcast packets within the VLAN. FIG. 4 shows an example MGID 28-1 for switch 1, that switch 1 will use to identify output ports associated with VLAN ID=29. In particular, MGID 28-1 includes a 1 value at locations associated with ports [1-3, 1-7, 1-8, 1-15, 1-17, 1-18, 1-19] and zeros elsewhere. Likewise MGID 28-2 includes a 1 value at locations associated with ports [2-1, 2-2, 2-5, 2-9, 2-13, 2-16, 2-17, 2-18, 2-19] and zeros elsewhere. Many ways of defining how a switch should handle broadcast traffic within a VLAN may be implemented and the use of a particular construct is likely to depend on the switch architecture and the particular implementation of the hardware in use. Accordingly, the MGIDs described and shown in FIG. 4 are intended to provide a conceptual understanding of the functions to be implemented by the switch. Other embodiments may be implemented differently to achieve these same or similar functions.

Because each switch 12 of the switch group 14 implements the VLAN using a single MGID, each port associated with the VLAN will receive a copy of each broadcast packet. FIG. 6 shows an example of how the switches 12 of the switch group 14 may handle broadcast traffic to prevent layer 2 loops from being formed. According to an embodiment, as described in connection with FIG. 4, when a LAG/MLT is configured, a global LAG/MLT ID is assigned to the LAG/MLT and installed in each switch (100). Each switch will associate the LAG/MLT ID with ports that are connected to links of the LAG/MLT. For example, in FIG. 4 switch 1 would associate LAG/MLT ID=23 with ports 1-7 and 1-8, and switch 2 would associate this same LAG/MLT ID=23 with ports 2-1 and 2-2. Likewise, as discussed above, each switch creates a single MGID per VLAN ID which will be used to control forwarding of broadcast traffic associated with the VLAN, regardless of whether the broadcast packet is received on an IST port or on a user port (102).

The switches in the switch group will handle traffic differently depending on where the broadcast traffic is received, however. Specifically, as shown in FIG. 6, If a broadcast packet is received from a user port (104) the switch will transmit the packet on all ports associated with the VLAN as specified by the MGID (106). Additionally, each packet transmitted on the IST will be tagged with the global LAG/MLT ID (108). For example, in FIG. 4, assume that a broadcast packet is received by switch 1 on port 1-7. The broadcast packet will be broadcast on all output ports identified by the MGID for the VLAN on switch 1, which in this instance include user ports 1-3, 1-15, and 1-8, and IST ports 1-17, 1-18, and 1-19. User port 1-8 is a member of the LAG/MLT ID and, hence, that packet will be dropped and not forwarded back to switch 18 over port 1-8. Broadcast packets transmitted on user ports 1-3 and 1-15 are not tagged with the LAG/MLT ID since that value is specific to the switch group and not relevant elsewhere on the network. Packets transmitted on IST ports 1-17, 1-18, and 1-19 are tagged with LAG/MLT ID=23 prior to being transmitted on the IST.

When a broadcast packet is received on an IST port (110), the broadcast packet will have previously been tagged with a LAG/MLT ID (as noted above in connection with 108), and hence the broadcast packet will contain the LAG/MLT ID of the LAG/MLT on which the original switch received the packet. The receiving switch will use its MGID for the VLAN to determine a set of output ports for the packet and make copies of the packet for each output port. Any copy that is destined to the receiving IST port will be dropped (112). Any packet copies destined to a LAG/MLT port with a matching LAG/MLT ID will also be dropped (114). Copies of the packet that are destined to IST ports other than the receiving IST port or to user ports will be forwarded out over those ports. Specifically, the LAG/MLT ID will be removed from the broadcast packet when the packet is broadcast out user ports identified by the MGID (116). However, the LAG/MLT ID will not be removed for packets transmitted out other IST ports other than the IST port on which the packet was received (118).

For example, referring to FIG. 4, assume that a broadcast packet was received at switch 1, tagged with LAG/MLT ID=23, and forwarded over IST port 1-17. Switch 2 will receive the packet on IST port 2-17 and, using its MGID for the VLAN, make 9 copies of the packet corresponding to ports [2-1, 2-2, 2-5, 2-9, 2-13, 2-16, 2-17, 2-18, 2-19]. The copies of the packets that are destined to the IST port on which the packet was received will be dropped, which will cause packets destined to ports 2-17, 2-18, and 2-19 to be dropped. Likewise, packets that are destined to user ports associated with LAG/MLT ID=23 will also be dropped, which will cause packets destined to ports 2-1, 2-2 to be dropped. The remaining packets destined for ports 2-9, 2-13, and 2-16, will be forwarded. Prior to forwarding, LAG/MLT ID=23 will be removed from the packets since that value is local to the switch cluster 14 and not relevant elsewhere in the network. If Switch 2 was connected to other switches in the switch group, such as shown in FIG. 2, copies of the packet forwarded on the IST would carry the same LAG/MLT ID=23 when transmitted from switch 2 to the other switches of the switch group.

Since a single MGID is used per switch to implement forwarding within the VLAN, and since membership in the LAG/MLT does not change with port failure, port failure synchronization is not required between switches of the switch cluster. Specifically, remote port failure does not affect MGID implementation on other switches of the switch cluster, so that port failure synchronization is not required to prevent loop formation associated with broadcast traffic being handled by the switch cluster.

Figure 5:
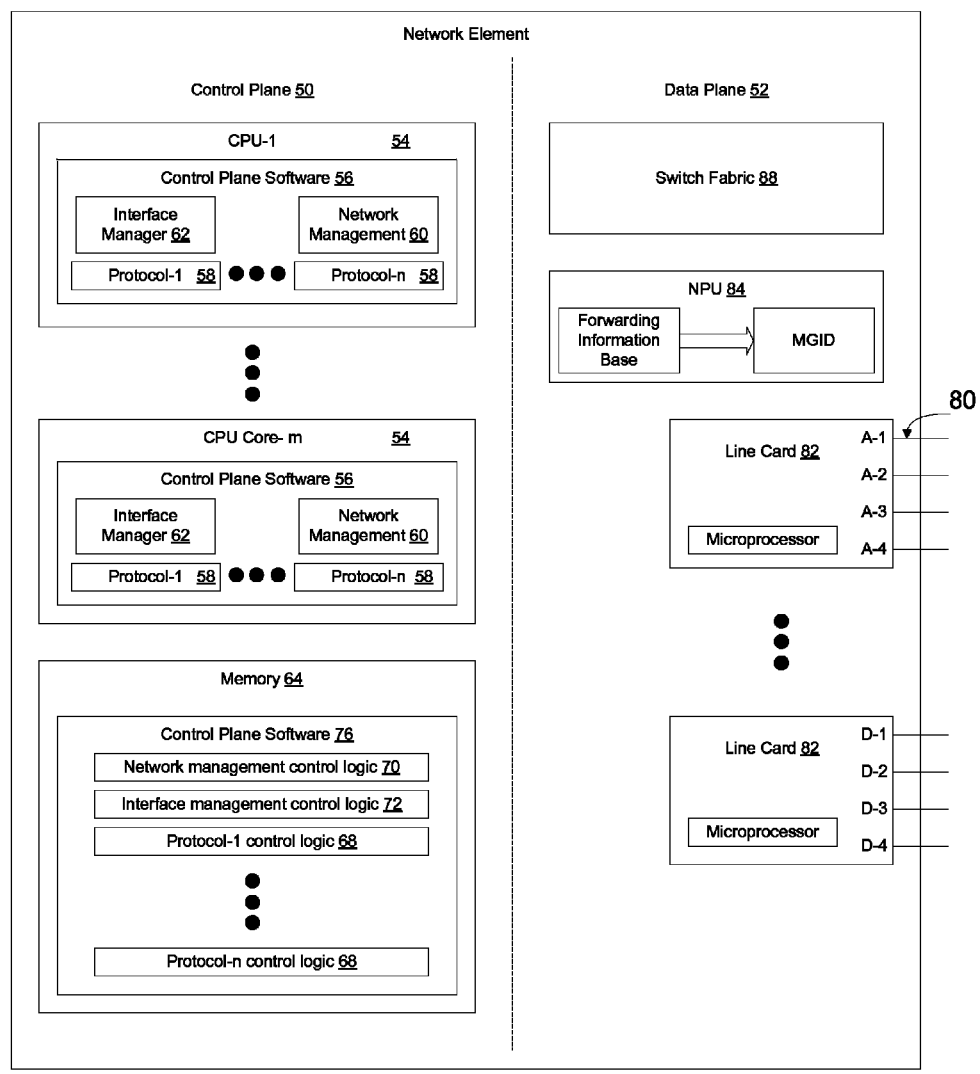
FIG. 5 is a functional block diagram of a network element configured to implement loop prevention according to an embodiment.

FIG. 5 shows an example network element that may be configured to implement layer 2 loop prevention according to an embodiment. Loop prevention, as described herein, may be implemented on network elements configured in many different ways and the example shown in FIG. 5 is merely intended to provide one example of how a network element may be configured to implement the functions described in greater detail above. The network element of FIG. 5 may be used as an edge network element such as an edge router, a core network element such as a router/switch, or as another type of network element. The network element of FIG. 5 may be implemented on a communication network utilizing one of the Ethernet 802.1 standards, such as 802.1ad, 803.2ah, 802.1Qay, 802.1aq, or other routed Ethernet standard. The network element of FIG. 5 may also be used in other types of wired/wireless communication networks.

As shown in FIG. 5, the network element includes a control plane 50 and a data plane 52. Control plane 50 includes one or more CPU cores 54, which may be physical CPU cores or a virtual machine running on a physical CPU core. Each CPU core is running control plane software 56, which may include, for example, one or more routing processes 58, network operation administration and management software 60, an interface creation/management process 62, and other processes.

The network element also includes memory 64 containing data and instructions which, when loaded into CPU 54, enable the CPU 54 to implement the processes described above. Specifically, memory 64 includes control plane software 76, which includes network management control logic 70, interface management control logic 72, and protocol control logic 68. The interface management control logic allows interfaces to be created, defined, and destroyed on the network element. For example, when creating a LAG/MLT, the interface management control logic, when executed by CPU 54, allows a global LAG/MLT ID to be associated with the interface. Optionally the network management control logic may also allow this value to be specified via a network management system.

The protocols in use on the network, for example routing protocols such as Intermediate System to Intermediate System (IS-IS) or Open Shortest Path First (OSPF), allow VLANs to be created on the network and allow ports to be associated with VLANs as they are created and modified. Optionally, the LAG/MLT ID associated with ports may be communicated between network elements of the switch group using the routing system. Alternatively, an inter switch communication protocol may be used to synchronize this value between network elements of the switch group. Information from the routing system is programmed into the data plane to cause the network element to implement decisions made by the routing system. For example, the routing system may determine the ports associated with the VLAN, as described above in connection with FIG. 4, and cause information associated with the VLAN such as forwarding information to be programmed into the data plane 52.

The data plane 52 includes ports 80 which connect with physical media to receive and transmit data. The physical media may include fiber optic cables or electrical wires. Alternatively, the physical media may be implemented as a wireless communication channel, for example using one of the cellular, 802.11 or 802.16 wireless communication standards. In the illustrated example, ports 80 are supported on line cards 82 to facilitate easy port replacement, although other ways of implementing the ports 80 may be used as well. The line cards may have some processing capabilities such as a microprocessor or other hardware configured to format the packets, perform pre-classification of the packets, etc. Other processing may be implemented in the line cards and elsewhere in the data plane as is known in the art. Details associated with a particular implementation have not been included in FIG. 5 to avoid obfuscation of the salient features associated with an implementation of an embodiment of the invention.

The data plane 52 further includes a Network Processing Unit (NPU) 84 and a switch fabric 88. The NPU and switch fabric enable data to be switched between ports to allow the network element to forward network traffic toward its destination on the network. In one embodiment, when a broadcast packet is received, the NPU determines the MGID to be used to forward the packet, creates the packet copies according to the MGID, and implements the packet dropping rules described in greater detail above to cause packets to be forwarded only to the correct ports associated with the VLAN while preventing looping of broadcast packets. In another embodiment, the ports perform the dropping function by comparing the LAG/MLT ID of the packet copy with a locally provisioned LAG/MLT ID that was configured at the port when the LAG/MLT was established on the network.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of layer 2 loop prevention in a multi-node switch cluster, the method comprising the steps of:
   associating, by a first node of the multi-node switch cluster, a LAG/MLT ID with each LAG/MLT port on the first node that connects to a link extending between the first node and a third node;
   associating, by a second node of the multi-node switch cluster, the LAG/MLT ID with each LAG/MLT port on the second node that connects to a link extending between the second node and the third node;
   receiving a broadcast packet associated with a VLAN on one of the LAG/MLT ports on the first node;
   tagging at least one copy of the broadcast packet with the LAG/MLT ID;
   transmitting copies of the broadcast packet on all user ports on the first node associated with the VLAN except ports associated with the LAG/MLT ID;
   transmitting the tagged copy of the broadcast packet on an inter-switch trunk to the second node of the multi-node switch cluster;
   wherein the first node maintains only one MGID per VLAN, the only one MGID being a bitmap applied by the first node to the broadcast packet and identifying a set of output ports for the VLAN at the first node, the only one MGID being used by the first node to forward broadcast packets associated with the VLAN received on the LAG/MLT ports as well as to forward broadcast packets associated with the VLAN received on the inter-switch trunk; and
   wherein the MGID is used only within the first node and is removed by the first node prior to forwarding broadcast packets on the inter-switch trunk.

2. The method of claim 1, further comprising the step of removing the LAG/MLT ID tag from the broadcast packet copies prior to transmitting the broadcast packet copies on user ports.

3. The method of claim 1, wherein the step of transmitting copies of the broadcast packet is performed, by one of the LAG/MLT ports, by comparing the LAG/MLT ID of the broadcast packet copy with the LAG/MLT ID associated with the LAG/MLT port and dropping the broadcast packet copy if the LAG/MLT ID of the broadcast packet copy is the same as the LAG/MLT ID associated with the LAG/MLT port.

4. The method of claim 1, wherein the LAG/MLT ID on the first node is the same as the LAG/MLT ID on the second node.

5. The method of claim 4, wherein the LAG/MLT ID is a value specific to the switch cluster and not relevant elsewhere on a network incorporating the switch cluster.

6. The method of claim 1, wherein any broadcast packet copies destined to a LAG/MLT port with a matching LAG/MLT ID will be dropped.

7. The method of claim 1, further comprising the steps of:
receiving the tagged packet by the second node on a port associated with the inter-switch trunk;
creating copies of the tagged packet for each port associated with the VLAN on the second node;
dropping all copies of the tagged packet for user ports associated with the LAG/MLT ID;
dropping all copies of the tagged packet for inter-switch trunk ports connected to links to the first node;
removing the LAG/MLT ID from all copies of the tagged packet to be transmitted on user ports; and
forwarding tagged copies of the broadcast packet on all IST ports associated with the VLAN other than IST ports connected to links to the first node.

8. The method of claim 7, wherein the step of dropping all copies of the tagged packet for user ports associated with the LAG/MLT ID is performed, by one of the LAG/MLT ports, by comparing the LAG/MLT ID of the broadcast packet copy with the LAG/MLT ID associated with the LAG/MLT port and dropping the broadcast packet copy if the LAG/MLT ID of the broadcast packet copy is the same as the LAG/MLT ID associated with the LAG/MLT port.

9. The method of claim 7, wherein the LAG/MLT ID is local to the switch cluster.

10. The method of claim 7, wherein the second node maintains a single MGID identifying a set of output ports per VLAN, the MGID of the second node being local to the second node and unrelated to the MGID maintained by the first node.

11. The method of claim 10, wherein port failure of the first node does not affect the MGID of the second node such that port failure synchronization is not required between the first and second nodes.

12. A system, comprising:
a first network element;
a second network element;
an Inter Switch Trunk (IST) connecting the first network element with the second network element;
a Split MultiLink Trunk (SMLT) interconnecting the first and second network elements with a third network element;
wherein the first and second network elements are configured to exchange broadcast packets tagged using a LAG/MLT ID associated with the SMLT that is the same on both the first and second network elements and associated by both the first and second network elements with ports associated with the SMLT;
wherein the first network element maintains a first MGID per VLAN, the first MGID being a bitmap applied by the first network element to broadcast packets associated with the VLAN and identifying a set of output ports for the VLAN at the first network element, the first MGID being used by the first network element to forward broadcast packets associated with the VLAN received on the LAG/MLT ports as well as to forward broadcast packets associated with the VLAN received on the inter-switch trunk; and
wherein the first MGID is used only within the first network element and is removed by the first network element prior to forwarding broadcast packets associated with the VLAN on the inter-switch trunk.

13. The system of claim 12, wherein ports on the first and second network element interconnected with the SMLT are provisioned with the LAG/MLT ID associated with the SMLT, and wherein the ports on the first and second network element interconnected with the SMLT are programmed to not forward any broadcast packets associated with the VLAN on the SMLT that are tagged with the LAG/MLT ID.

14. A system for layer 2 loop prevention in a multi-node switch cluster, the system comprising:
at least one processor;
a first network interface operable to couple the processor to a first link of a Split Multi-Link Trunk (SMLT) implemented on a communication network;
a second network interface operable to couple the processor to an Inter-Switch Trunk (IST) extending to a second node of the switch cluster, the second node of the switch cluster having at least one network interface connected to a second link of the SMLT implemented on the communication network; and
at least one memory operable to store instructions for execution by the at least one processor, the instructions being executable:
to create tagged copies of broadcast packets received on the first link, the tagged copies of the broadcast packets being tagged with an identifier unique to the switch cluster and associated with the SMLT;
to forward the tagged broadcast packet copies on the IST; and
to drop broadcast packet copies on the first network interface received via the IST which are tagged with the identifier unique to the switch cluster and associated with the SMLT;
wherein the system maintains a first MGID per VLAN, the first MGID being a bitmap applied by the system to the broadcast packets associated with the VLAN and identifying a set of output ports for the VLAN at the system, the first MGID being used by the system to forward broadcast packets associated with the VLAN received on the LAG/MLT ports as well as to forward broadcast packets associated with the VLAN received on the inter-switch trunk; and
wherein the first MGID is used only within the system and is removed by the system prior to forwarding broadcast packets on the IST.

* * * * *